July 20, 1948.　　　　A. G. HORTON　　　　2,445,397
WHEEL ALIGNING STAND
Filed June 7, 1945　　　　　　　　　　　　4 Sheets-Sheet 1

Inventor
Alfred George Horton,
By Clarence A. O'Brien
and Harvey B. Jacobson
Attorneys July 20, 1948. A. G. HORTON 2,445,397
WHEEL ALIGNING STAND
Filed June 7, 1945 4 Sheets-Sheet 2

Inventor
Alfred George Horton,
By Clarence A. O'Brien
and Harvey B. Jacobson
Attorneys July 20, 1948. A. G. HORTON 2,445,397
WHEEL ALIGNING STAND
Filed June 7, 1945 4 Sheets-Sheet 3

Inventor
Alfred George Horton,

By Clarence A. O'Brien
and Harvey B. Jacobson
Attorneys

July 20, 1948.　　　　　　A. G. HORTON　　　　　　2,445,397
WHEEL ALIGNING STAND
Filed June 7, 1945　　　　　　　　　　　　　　　　4 Sheets-Sheet 4
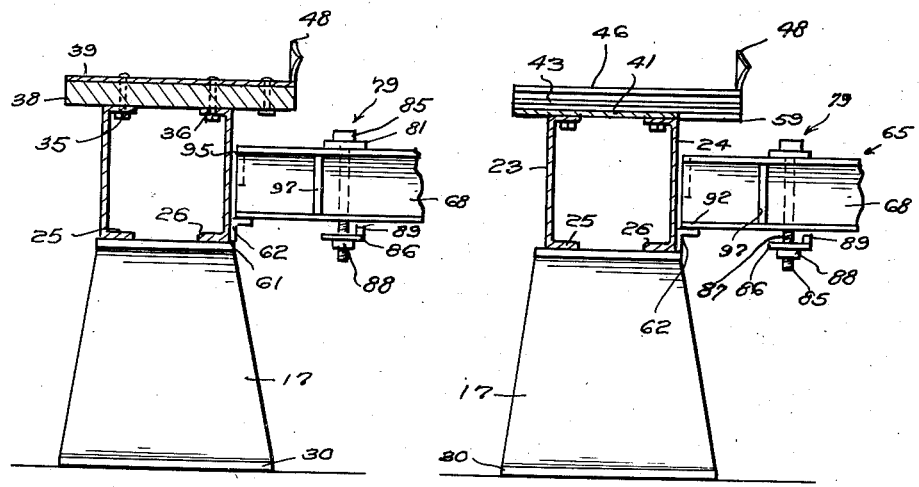
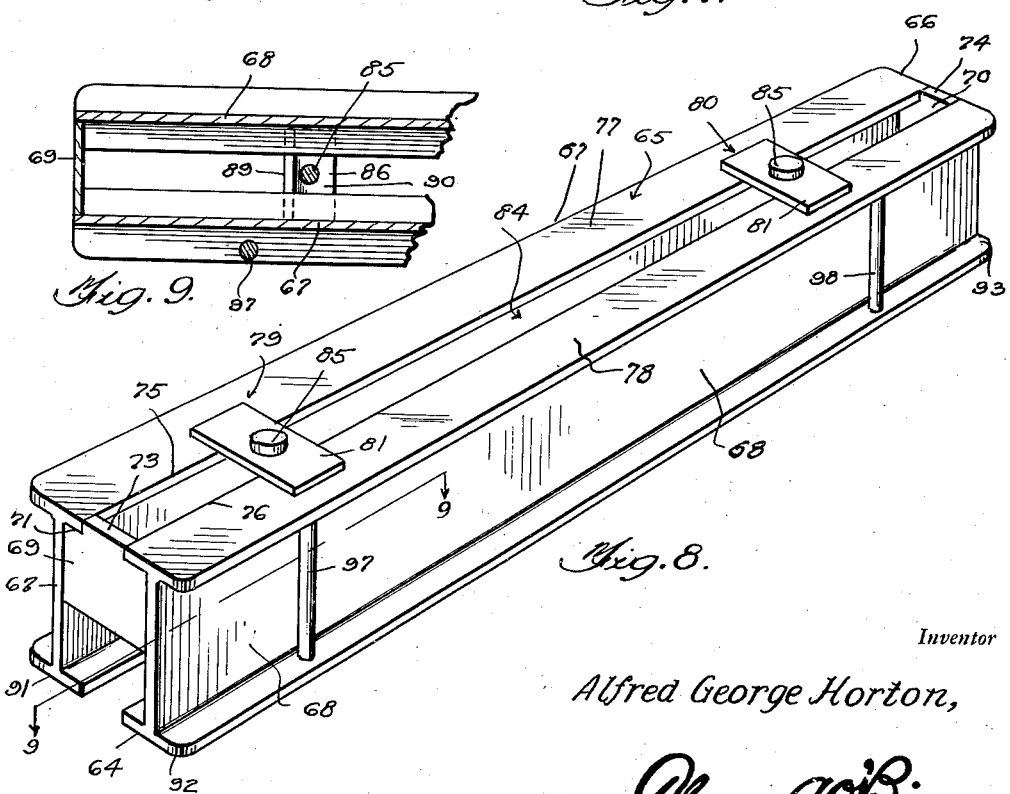
Inventor
Alfred George Horton, Patented July 20, 1948

2,445,397

UNITED STATES PATENT OFFICE 2,445,397

WHEEL ALIGNING STAND

Alfred George Horton, Jacksonville, Fla.

Application June 7, 1945, Serial No. 598,141

2 Claims. (Cl. 153—32)

This invention relates to garage equipment and has for an object to provide a wheel aligning stand provided with a slidable reaction bar.

Another object of this invention is to provide a wheel aligning stand formed under floor surface level and having an adjustable reaction bar.

A further object of my invention is to provide a wheel aligning stand so arranged that an automobile, trailer, or truck may be driven thereon from level, a pit being provided under the stand and a reaction bar to which the axle of the vehicle may be secured, the bar being adjustable to the position of the axle either when straight or at any angle relative to the stand, and may be adjusted for both camber and caster adjustment of the vehicle wheels.

Other features and advantages will become more readily apparent from the following description and the accompanying illustrative drawings in which:

Figure 6 is a section taken on line 6—6 of Figure 1,

Figure 7 is a sectional view on line 7—7 of Figure 1,

Figure 8 is an enlarged perspective view of a reaction bar, and

Figure 9 is a sectional view taken on line 9—9 thereof.

Figures 1, 2:
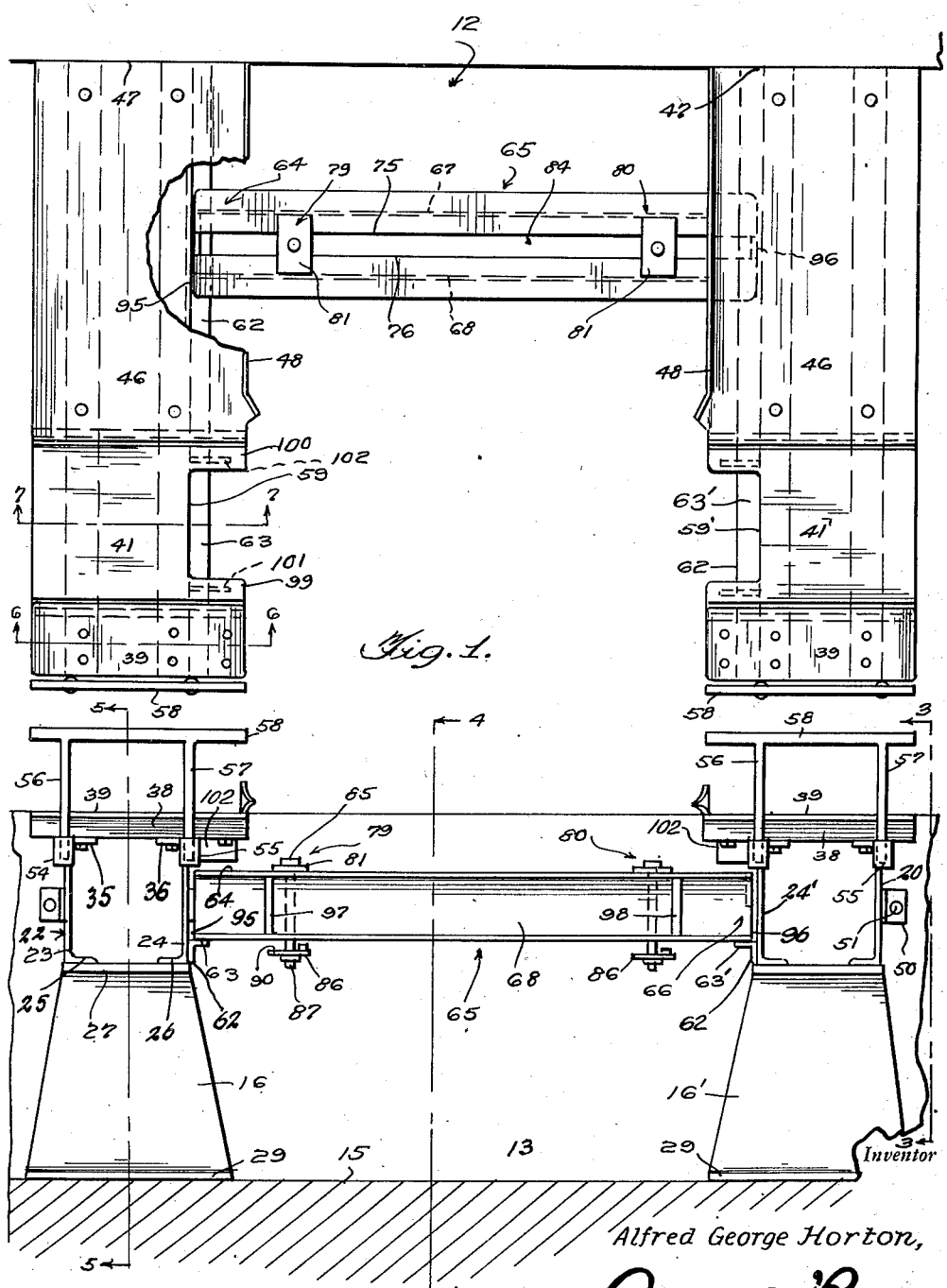
Figure 1 is a top plan view of my stand.
Figure 2 is a front elevational view thereof.
Figure 3:
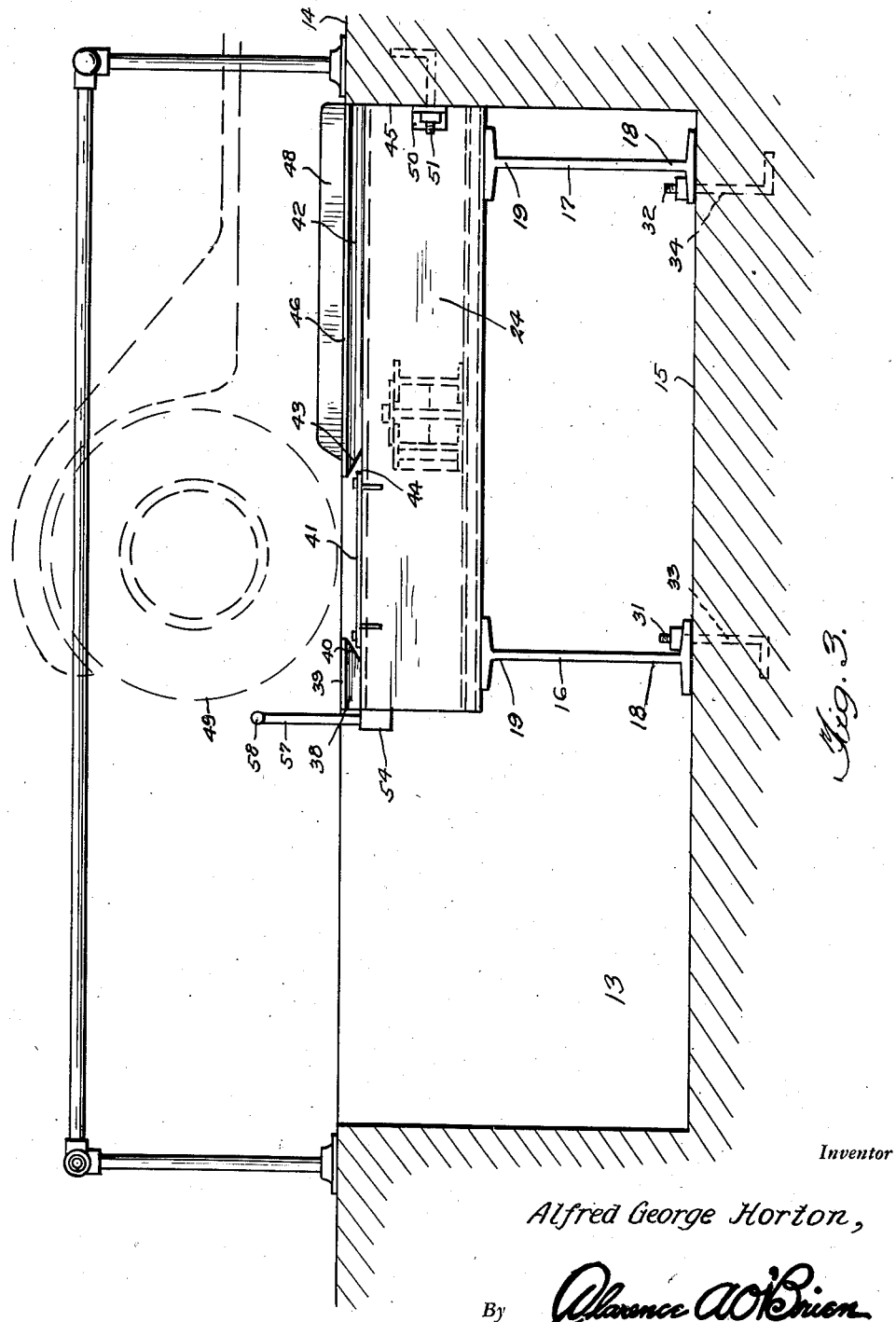
Figure 3 is a side elevational view seen from line 3—3 of Figure 2.
Figure 4:
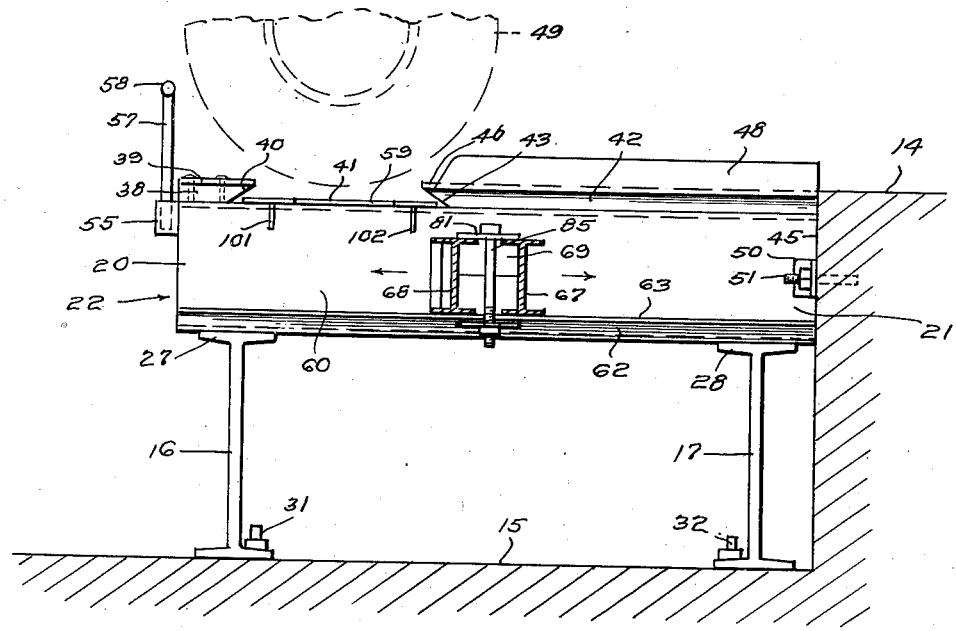
Figure 4 is a section on line 4—4 of Figure 2.
Figure 5:
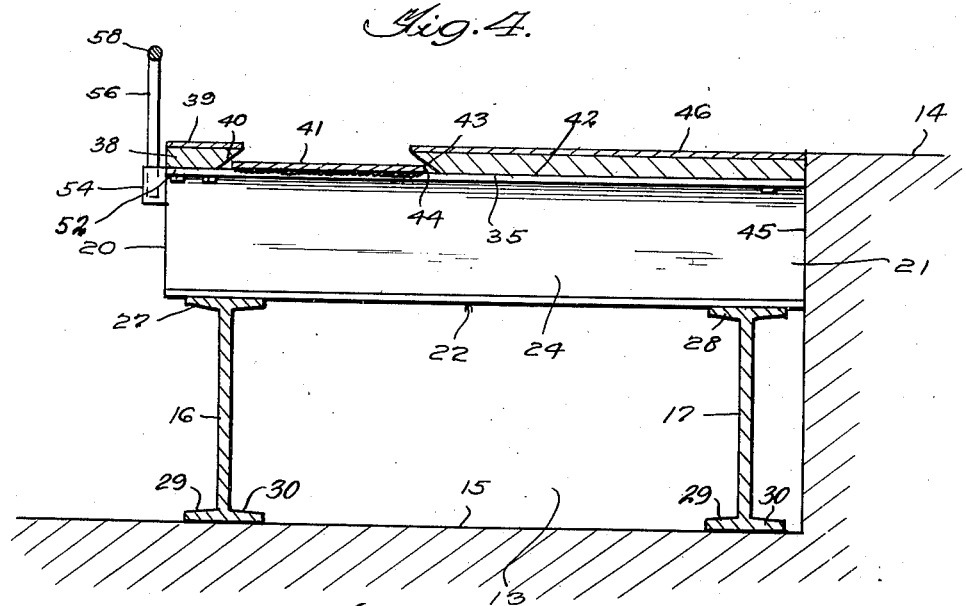
Figure 5 is a sectional view taken on line 5—5 of Figure 2.

In the specification now to follow, as well as in the accompanying drawings, like reference characters indicate like parts and in which 12, is a wheel aligning stand, built within a preferably cement pit 13, of such depth that the top of the superstructure of the stand will be on a level with the floor 14, of a garage or other place where the stand is located.

Upon the bottom wall 15, of the pit, are two spaced apart I-beam piers 16 and 17, each tapering from the bottom 18, to the top 19, thereof. Seated upon said tops are the ends 20 and 21, of a lintel 22, which is formed of a pair of channel irons 23 and 24, the flanges 26 and 25 respectively, of which are turned in and welded to the flanges 27 and 28 respectively, of the said piers 16 and 17, the bottom flanges 29 and 30, of which are anchored by bolts 31 and 32, embedded in the cement of bottom cement floor 15, as at 33 and 34.

Bolted to the flanges 35 and 36, of the channel irons 23 and 24, at the free end 20, of said lintel is an oak board 38, topped by a steel plate 39, the inner edge 40, of the board being beveled to over-reach a turntable supporting plate 41, for a single wheel turntable (not shown). Inwardly of said plate 41, on the said flanges 35 and 36, is another board 42, the outer end 43, of which is beveled to over-reach the plate 41, on its side 44. This board extends from said plate 41, to the wall 45, against which it abuts. Seated upon the board 42, is a wheel runway steel plate 46, which with the board is bolted to said flanges 35 and 36, and the rear end 47, of which also abuts the wall 45. This plate is on a common horizontal plane with the floor 14. The inner edge 48, of plate 46, is turned up vertically to form a guide flange for a car wheel 49. The inner end 21, of the lintel is secured to the wall 45, by flanges 50 and bolts 51.

Welded to the upper free edges 52 and 53, of channel members 23 and 24, are sockets 54 and 55, into which the posts 56 and 57, of a stop bar 58, are adapted to seat. This stop will limit the forward movement of a car on the stand, but it is removable when in the way of a mechanic. The plate 41, is provided with a cut-out 59, the purpose of which will later be referred to. Welded to the face 60, of channel iron 24, along the entire lower edge 61 thereof, is an angle iron 62, the horizontal flange 63, of which forms one track member, upon which is slidably seated one end 64, of a reaction bar 65, which is one of the principal features of my invention and which I will now detail in full.

The slidable reaction bar 65, as above stated, has one end supported upon the track 63; the other end 66, of which seats upon a rail 63', which will again be referred to. This reaction bar 65, is formed of two parallel I-beams 67 and 68, held spaced apart by spacer plates 69 and 70, at said ends 64 and 66; these plates have projecting from them upper edges 71 and 72, tongues 73 and 74, which seat between the opposing edges 75 and 76, of the upper flanges 77 and 78, of said I-beams 67 and 68. These plates 69 and 70, are welded to the said beams. These beams have mounted thereon clamp members 79 and 80, each of which are formed alike and each comprise a saddle plate 81, seated upon the upper flanges 77 and 78, of the beams 67 and 68, spanning the space 84, between said edges 75 and 76. A bolt 85, connects the plate 81, with a similar plate 86, mounted upon the lower threaded end 87, of said bolt and held thereto by a nut 88. The plate 86, however, is provided with a bar 89, welded to its upper surface 90. The terminals 91, 92 and 93 and 94, rest upon the angle iron flanges 63 and 63', and the reaction bar 65, is very easily slidable thereupon and otherwise adjustable thereon, there being sufficient clearance 95 and 96, between its ends and the channel irons 24 and 24', for angular adjustment thereof to align the bar with a car axle thereover. Handle bars 97 and 98, are provided by means of which the reaction bar 65, may easily be moved. The clamps 79 and 80, are slidably adjustable on member 65, whereby they may be shifted when necessary for connection to chains or other implements and they may be readily tightened by means of said nuts 88.

The cut-outs 59 and 59', in plates 41 and 41', are provided in order that the work bench 65, may be brought into alignment therewith and raised at one end or the other for camber adjustment of a wheel. The projections 99 and 100, of said plate 41, is supported by brackets 101 and 102, and the projecting edges 103, of boards 38 and 42, may be supported by suitable braces (not shown).

By providing a movable reaction bar, or bench 65, in lieu of the usual fixed bar used for a similar purpose, the mechanic is allowed perfect freedom of movement in order to reach and adjust any under members of a car, as well as aligning the wheels, without having to continually crawl under the work bar. The bench can readily be tilted to the angle of high caster pitch axles and adjusting camber without causing the axle to bend forward or backward for the adjustment. The clamps are used to affix and strengthen hook-up of correction tools in obtaining exact alignment of wheels and also hold the beam stationary as a work or reaction bar and overcomes the usual danger caused by excessive pull or strain in correcting front ends or axles of cars, thus affording protection to the operator against side slips or tilt.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted in, in actual practice, if desired.

Having now described my invention, that which I claim as new and desire to procure by Letters Patent is:

1. A wheel aligning stand adapted to be secured within a work pit to extend substantially on a level with the top edge of the pit, said stand comprising pairs of transversely spaced longitudinally aligned piers of I-beam construction being wider on their lower ends than on their upper ends, parallel lintels secured upon the longitudinally spaced pairs of piers, longitudinally spaced trackways secured upon said lintels and formed with the adjacent ends of said trackways being undercut, turntable supporting plates disposed upon said lintels between the adjacent ends of said trackways and formed with opposed cut-out inner edges, guard supporting sockets on one end of said lintels, wheel guards detachably supported in said sockets, attaching flanges on the opposite ends of said lintels, anchoring bolts extending through said attaching flanges being imbedded within a vertical wall of said pit, anchoring bolts extending through the base flanges of said I-beam piers imbedded within the floor of said pit, longitudinally extending supporting angle iron flanges on the inner sides of said lintels, and a reaction bar supported for longitudinal adjustment upon said angle iron flanges and vertically adjustable through said opposed cut-out portions of said turntable supporting plates whereby either end of said reaction bar may be elevated to and above the level of said trackways.

2. A wheel aligning stand adapted to be secured within a work pit to extend substantially on a level with the top edge of the pit, said stand comprising pairs of transversely spaced longitudinally aligned piers, parallel lintels secured upon the longitudinally spaced pairs of piers, longitudinally spaced trackways secured upon said lintels and formed with the adjacent ends of said trackways being undercut, turntable supporting plates disposed upon said lintels between the adjacent ends of said trackways and formed with opposed cut-out inner edges, means for anchoring said lintels to a vertical wall of said pit, means for anchoring said piers to the floor of said pit, longitudinally extending supporting angle iron flanges on the inner sides of said lintels, and a reaction bar supported for longitudinal adjustment upon said angle iron flanges and vertically adjustable through said opposed cut-out portions of said turntable supporting plates whereby either end of said reaction bar may be elevated to and above the level of said trackways.

ALFRED GEORGE HORTON.

REFERENCES CITED

The following references are of record in the file of this patent:

UNITED STATES PATENTS

| Number | Name | Date |
|---|---|---|
| 1,077,253 | Bohannon et al. | Nov. 4, 1913 |
| 1,650,216 | Ingham | Nov. 22, 1927 |
| 1,743,091 | Bells | Jan. 14, 1930 |
| 1,836,369 | Friese | Dec. 15, 1931 |
| 1,891,490 | Wochner | Dec. 20, 1932 |
| 1,907,925 | Wochner | May 9, 1933 |
| 2,042,856 | Merrill | June 2, 1936 |
| 2,045,109 | Smith | June 23, 1936 |
| 2,087,909 | Haucke | July 27, 1937 |